Patented Aug. 5, 1930

1,772,349

UNITED STATES PATENT OFFICE

ROY LINDEN HILL, OF WILMINGTON, DELAWARE, ASSIGNOR TO DARCO CORPORATION, A CORPORATION OF DELAWARE

METHOD OF TREATING MILK

No Drawing.   Application filed October 20, 1927.   Serial No. 227,618.

The object of this invention is to furnish means for preventing the large economic losses resulting from the rejection of milk which is not as pleasantly potable as might be desired. More specifically, it deals with the removal from milk of foreign tastes and odors, impurities generally, whether in suspension or in solution, as well as harmful bacteria to a marked extent, without appreciably altering the composition or other desirable properties of the milk.

Foreign tastes and odors in milk may arise from a variety of causes, both internal and external to the animal producing the milk. Especially in the spring of the year there is the so-called garlicky or grassy condition, one of internal origin resulting from the food of the animal. Examples of external origin are as numerous as conditions under which milk is produced and stored, such as barnyard odors absorbed at the place of production and fruit and vegetable odors absorbed in case of storage in proximity to such materials. Suspended impurities may arise from many sources, typified by material blowing in or falling in the milk. Impurities from similar sources may be soluble in the milk, and, consequently, can not be removed by ordinary straining or filtration steps.

The purification means which I use is capable of dealing with any of the above mentioned types of contamination, except that dissolved material of an inorganic nature, such as ordinary table salt, is not appreciably affected. This is, in fact, a desirable condition because in removing harmful materials, I do not interfere with the valuable mineral salts. While it is not my desire to encourage the production and sale of milk in any way open to suspicion, I must mention, in order to protect my entire invention, that the removal of harmful bacteria may be accomplished by my process. It is not recommended that milk known to be contaminated with harmful bacteria be purified in this respect by my process, because there are too many uncertainties involved. However, to the extent that it works in this direction while performing other functions previously specified, the trend is in the right direction.

My process involves the treatment of milk with activated carbon or bone-char, especially the highly activated vegetable carbons, such as Darco, which are now available at a reasonable price. Either a finely powdered or a granular product may be used, depending upon the convenience and economy of the case in hand. For the same reasons, the installation may be a simple, home-made arrangement, or an elaborate industrial installation. The amount of purifier to be used is also governed by the conditions involved in a particular case.

By way of example, I will first consider a large installation using finely powdered carbon. I have found that 0.4% of a high-grade carbon, such as Darco, will cope with very severe conditions and that usually a lesser amount is suitable, but I do not wish to be limited in this respect, because I cannot entirely predict the conditions which I may encounter. It has been my experience that no garlicky or grassy taste or odor remains after a 0.4% treatment in any samples which I have tested.

The carbon should be thoroughly mixed with the milk in suitable tanks and kept so mixed for at least five minutes, when it may be removed by filtration, such as with a filter press. When all treated milk to be filtered, has been run through the filter or the filter is filled with carbon cake, it is desirable to run hot water through the mass to wash residual milk from the carbon and filter and to generally sterilize them. My process contemplates re-use of the carbon after mere washing and sterilization with hot water or after any of the well-known revivification treatments, when such re-use seems desirable.

Should a large installation desire to use granular carbon, the carbon in column form in a vertical tank or pipe should be suspended on blanket material, for instance, or blanket material and a sand bed, the object being to catch any fine particles of carbon which may be eroded from the granular material. The milk is then run through the mass at a rate dependent on conditions of contamination and degree of purity desired. Under this condition, no filter press is necessary, but great care must be taken that the filter mass is thoroughly washed with quantities of hot water so that it will be in pure condition for re-use.

The application of my process on any scale is essentially merely a modification of the foregoing descriptions. The farmer or household with only a few quarts of milk per day may treat the milk with fine carbon followed by simple gravity filtration through blanket material, a sand bed or both, or may perforate the bottom of a bucket, lay blanket material thereon, pour in a few inches of granular carbon and pour the milk through. It is obvious that means for applying the process are numerous and any mere revision of equipment over my examples is within the spirit of my invention.

It is of course common practice to strain or filter milk for the removal of impurities and this I do not claim, but as far as I am aware no method has heretofore been devised for removing from milk such intangible things as tastes and odors of an objectionable nature, such as the taste of garlic, for example.

It is desired, by way of further example, to show the economic and good will consequences of one of the best known conditions which my invention will correct, that of garlicky or grassy milk. During certain periods the milk producer on many farms can hardly prevent such a condition. If he ships such milk to a city distributor and it is returned to him, he feels a grievance and there is general loss. In turn, the city distributor is in disfavor with the farmer if he returns it, and with his customers if he sells it. Most milk users find such tastes and odors very objectionable. They also carry over into such milk products as cream, butter, ice cream, buttermilk and cottage cheese. My process will prevent all of this. The logical point of treatment would be where milk is collected together in large quantity as by a city distributor or large manufacturer of milk products, but the invention is in no way limited to this, as previously shown.

The admixture of other materials with my activated carbon, such as clay, kieselguhr, wood pulp, etc., either before or during treatment of the milk, are within the spirit of my invention; also the treatment of milk products such as cream.

While the mere placing of the activated carbon in the container of the milk, or the mere passing of the milk through the activated carbon, will secure the desired results, it is to be understood that the invention contemplates the use of any other steps deemed desirable, such for example as stirring the milk and carbon mixture, gently or rapidly, to bring every particle of the milk into contact with the carbon.

Having described my invention, what I claim is:

1. The herein described method of removing from milk the taste and odor of garlic arising from the bodily processes of the animal producing the milk, which consists of contacting garlicky milk with activated carbon and thereafter separating the carbon from the milk.

2. The herein described method of removing from milk the taste and odor of garlic arising from the bodily processes of the animal producing the milk, which consists of contacting garlicky milk with activated carbon for at least five minutes and thereafter separating the carbon from the milk.

In testimony whereof he affixes his signature.

ROY LINDEN HILL.